(12) United States Patent
Roberts et al.

(10) Patent No.: US 10,368,490 B2
(45) Date of Patent: Aug. 6, 2019

(54) CROP DIVIDER FOR AN AGRICULTURAL HARVESTER HEADER HAVING MULTIPLE HARVESTING REELS

(71) Applicant: CNH Industrial America LLC, New Holland, PA (US)

(72) Inventors: Craig Donald Roberts, Denver, PA (US); Scott Wilson, Denver, PA (US); Andrew Victor Lauwers, Stevens, PA (US); Cameron Ivey, Union Grove, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/663,056

(22) Filed: Jul. 28, 2017

(65) Prior Publication Data

US 2019/0029179 A1    Jan. 31, 2019

(51) Int. Cl.
| | |
|---|---|
| *A01D 57/02* | (2006.01) |
| *A01D 41/14* | (2006.01) |
| *A01D 57/03* | (2006.01) |
| *A01D 63/04* | (2006.01) |

(52) U.S. Cl.
CPC ........... *A01D 57/02* (2013.01); *A01D 41/142* (2013.01); *A01D 57/03* (2013.01); *A01D 63/04* (2013.01)

(58) Field of Classification Search
CPC ........ A01D 57/02; A01D 63/04; A01D 57/03; A01D 41/142; A01D 41/14; A01D 41/148; A01D 57/22; A01D 65/02; A01D 57/04

See application file for complete search history.

(56) References Cited

U.S. PATENT DOCUMENTS

| 1,073,819 A | | 9/1913 | Rice | |
|---|---|---|---|---|
| 3,139,718 A | | 7/1964 | Rickerd et al. | |
| 3,345,808 A | * | 10/1967 | Van Der Lely | A01D 34/246 56/10.2 R |
| 3,503,190 A | | 3/1970 | Van Der Lely | |
| 3,596,454 A | * | 8/1971 | Kluck | A01D 63/04 56/254 |
| 3,821,877 A | * | 7/1974 | Weinheimer | A01D 65/02 56/312 |

(Continued)

FOREIGN PATENT DOCUMENTS

| DE | 3730733 A1 | * | 4/1988 | ............. A01D 57/02 |
|---|---|---|---|---|
| EP | 2995189 A1 | | 3/2016 | |

(Continued)

OTHER PUBLICATIONS

European Search Report for European Application No. 18185995.0 dated Dec. 20, 2018 (5 pages).

*Primary Examiner* — Arpad Fabian-Kovacs
(74) *Attorney, Agent, or Firm* — Peter K. Zacharias; Patrick M. Sheldrake

(57) ABSTRACT

An agricultural harvester including a header and a cab for an operator of the harvester. The header includes a frame, a reel assembly having a first reel, and a second reel spaced from the first reel a fixed distance. The header further includes a reel support structure supporting the first and second reels for movement between first and second positions, and a crop divider connected to the reel assembly, wherein the crop divider substantially spans a width of the fixed distance.

19 Claims, 5 Drawing Sheets

(56) References Cited

U.S. PATENT DOCUMENTS

| | | | |
|---|---|---|---|
| 3,842,915 A * | 10/1974 | Henry, Sr. | A01D 45/22 171/1 |
| 4,199,927 A | 4/1980 | Craig et al. | |
| 4,330,983 A | 5/1982 | Moore | |
| 4,464,890 A | 8/1984 | Scholtissek et al. | |
| 4,587,799 A | 5/1986 | Thomas et al. | |
| 4,715,172 A | 12/1987 | Mosby | |
| 5,438,818 A | 8/1995 | Shelbourne et al. | |
| 5,904,032 A * | 5/1999 | Rippel | A01D 41/04 460/119 |
| 8,151,547 B2 | 4/2012 | Bich et al. | |
| 8,176,716 B2 * | 5/2012 | Coers | A01D 57/02 56/364 |
| 2003/0061794 A1 * | 4/2003 | Remillard | A01D 57/03 56/14.4 |
| 2005/0115217 A1 * | 6/2005 | Schrattenecker | A01D 41/148 56/14.7 |
| 2007/0204584 A1 * | 9/2007 | Coers | A01D 41/14 56/15.8 |
| 2010/0293914 A1 * | 11/2010 | Killen | A01D 57/04 56/128 |
| 2012/0304611 A1 | 12/2012 | Rayfield | |
| 2016/0066510 A1 | 3/2016 | Cook | |

FOREIGN PATENT DOCUMENTS

| | | | |
|---|---|---|---|
| WO | WO-2010021318 A1 * | 2/2010 | A01D 63/04 |
| WO | WO-2018140459 A1 * | 8/2018 | A01D 57/03 |

* cited by examiner

CROP DIVIDER FOR AN AGRICULTURAL HARVESTER HEADER HAVING MULTIPLE HARVESTING REELS

The exemplary embodiments of the present invention relate generally to a harvesting reel assembly for a header of a plant cutting machine (e.g., a combine harvester) and, more specifically, to a center crop divider of a harvesting reel assembly header that resists ingress of crop material between adjacent reels of the harvesting reel assembly.

BACKGROUND OF THE INVENTION

An agricultural harvester, e.g., a plant cutting machine, such as, but not limited to, a combine or a windrower, generally includes a header operable for severing and collecting plant or crop material as the harvester is driven over a crop field. The header has a plant cutting mechanism for severing the plants or crops, such as an elongate sickle mechanism that reciprocates sidewardly relative to a non-reciprocating guard structure or a row unit with gathering chains and deck plates.

To facilitate the cutting and collection of crop material, the header also includes a harvesting reel assembly. Harvesting reel assemblies, such as a pickup reel, a draper reel and a gathering reel, are used on agricultural harvesters to guide the crop to the cutting mechanism and onto a feeding apparatus. To facilitate collection, the harvesting reel assembly includes a plurality of reel members, i.e., tine bars, extending widthwise across the harvesting reel assembly with the tines extending outwardly therefrom to engage crop material as the tines are rotated about a rotational axis. To further facilitate collection, the reel members follow a cam track that guides the position of the tines.

In existing multiple reel assembly constructions, there is a fixed spacing between first and second adjacent reels. This spacing forms a gap within which uncut crop may collect and go unharvested. Moreover, the uncut crop may cause clogs that interfere with the workings of the reel assembly that must be periodically removed in order to maintain free rotation of the harvesting reels.

BRIEF SUMMARY OF THE INVENTION

The present disclosure provides a multiple reel header for an agricultural harvester having a crop divider.

In accordance with an exemplary embodiment, there is provided a header for an agricultural harvester including a frame and a reel assembly. The reel assembly includes a first reel and a second reel spaced from the first reel a fixed distance, and reel support structure supporting the first and second reels for movement between first and second positions. The header further includes a crop divider connected to the reel assembly, wherein the crop divider substantially spans a width of the fixed distance.

An aspect of the exemplary embodiment is that the crop divider is connected to the reel support structure. Another aspect of the exemplary embodiment is that the crop divider includes a beveled face including a central ridge flanked by rearwardly directed walls. Another aspect of the exemplary embodiment is that the rearwardly directed walls are convex. Another aspect of the exemplary embodiment is that the crop divider is elongated and curved. Another aspect of the exemplary embodiment is that the crop divider is positioned forwardly of the fixed distance and is connected to a forward end of the reel support structure.

Another aspect of the exemplary embodiment is that the crop divider is spaced from a bottom of the reel assembly. In addition, the crop divider extends from a bottom portion of the support structure to about a most forward end of the support structure.

Another aspect of the exemplary embodiment is that the reel support structure includes a cam assembly operatively engaged with at least one of the first and second reels, and the crop divider substantially covers a width of the cam assembly. Another aspect of the exemplary embodiment is that the reel support structure includes a first cam assembly engaged with the first reel and a second cam assembly engaged with the second reel, and wherein the crop divider extends between the first and second cam assemblies. Another aspect of the exemplary embodiment is that the reel support structure includes a first cam assembly engaged with the first reel and spaced from a second cam assembly engaged with the second reel defining the fixed distance The present disclosure thus provides a reel assembly having a crop divider disposed across the width of the fixed spacing between adjacent harvesting reels that diverts the crop being cut away from the gap between the harvesting reels and into the paths of the rotating reels whereby it may be effectively collected by the reels. The center crop divider substantially spans a width of the fixed distance between first and second adjacent reels and is connected to the reel support structure supporting the first and second reels for movement between first and second positions, whereby the crop divider moves in unison with the reel assembly between those positions.

When the crop divider is used in combination with a multiple reel agricultural harvester header, it overcomes one more of the disadvantages of conventional headers by providing structure for effectively diverting crop material into the rotating reels whereby it may be effectively collected by the reels and not become unharvested or cause clogging between the reels.

Other features and advantages of the present disclosure will be apparent from the following more detail description of the exemplary embodiments of the present disclosure.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject disclosure is not limited to the precise arrangements and instrumentalities shown.

In the drawings.

DETAILED DESCRIPTION OF THE INVENTION

Figure 1:
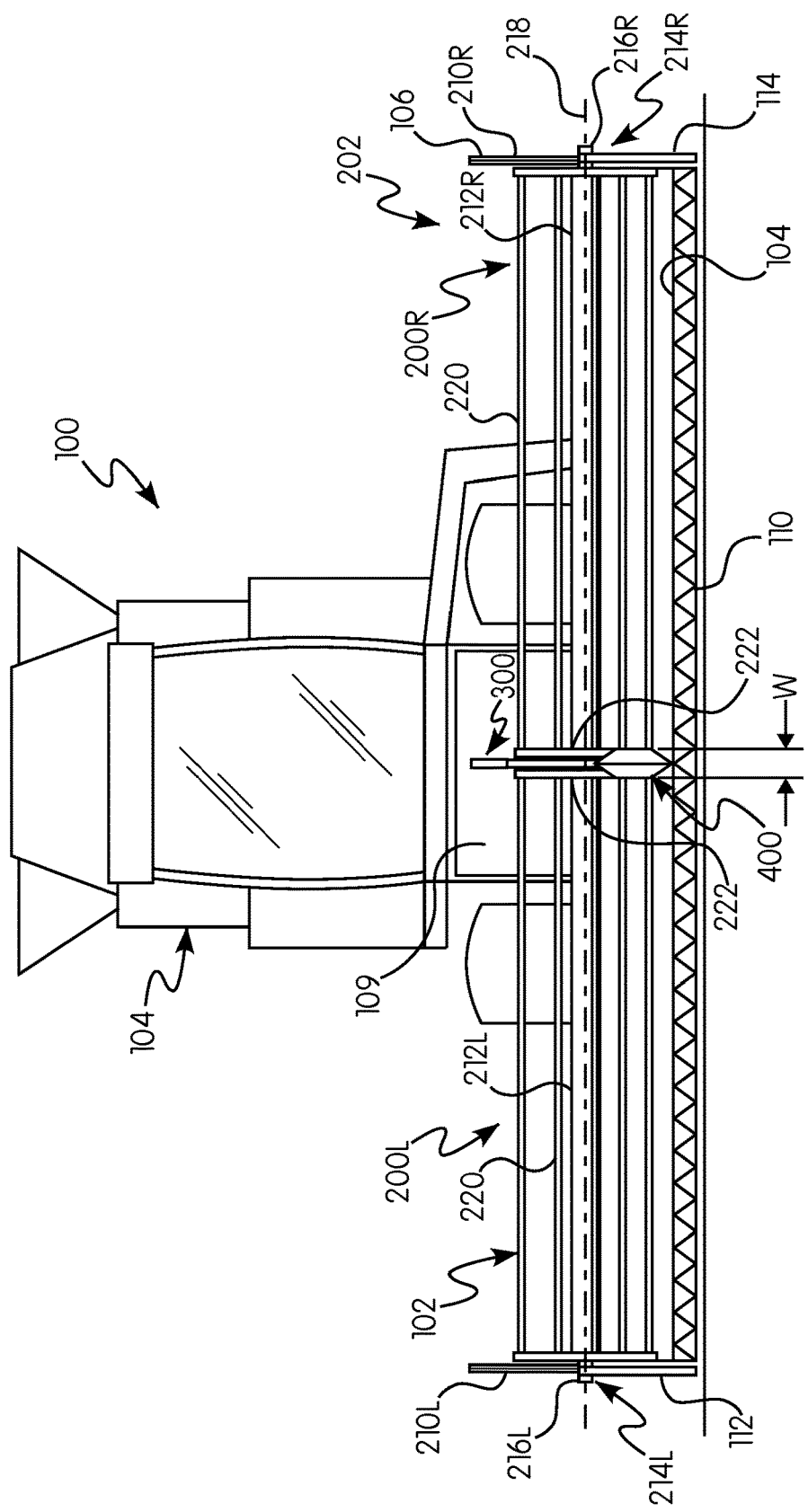
FIG. 1 is a front elevation view of an agricultural harvester including a header in accordance with an exemplary embodiment of the subject disclosure.

Reference will now be made in detail to the various embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject disclosure is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the subject disclosure can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the present disclosure can be practiced without one or more of the specific features or advantages of a particular exemplary embodiment. In other instances, additional features and advantages may be recognized in certain embodiments that may not be present in all exemplary embodiments of the subject disclosure.

Additionally, for convenience purposes only, identical or substantially similar elements of the subject disclosure, such as a plurality of reels 200R and 200L may be described with reference to only one of those elements, such as the reel 200R. It is appreciated therefore that the description of one element is equally applicable to the remainder of the same elements. As such, identical elements, or substantially identical elements where so indicated, will be identified, where appropriate, by the same reference numeral, e.g., 200, and distinguished by an alphabetical letter, e.g., R, L, etc. For example, the reel 200R is one of the reels and the reel 200L is another of the reels.

Referring now to the drawings wherein aspects of the subject disclosure are shown, FIGS. 1-5 illustrate an agricultural harvester 100 in accordance with an exemplary embodiment. For exemplary purposes only, the agricultural harvester is illustrated as a combine harvester. The harvester 100 comprises a header 102 and a cab 104 for an operator of the harvester. The header 102 includes a frame 106, reel support structure 300 (further described below) connected to the frame 106 and a harvesting reel assembly 202.

Figure 3:
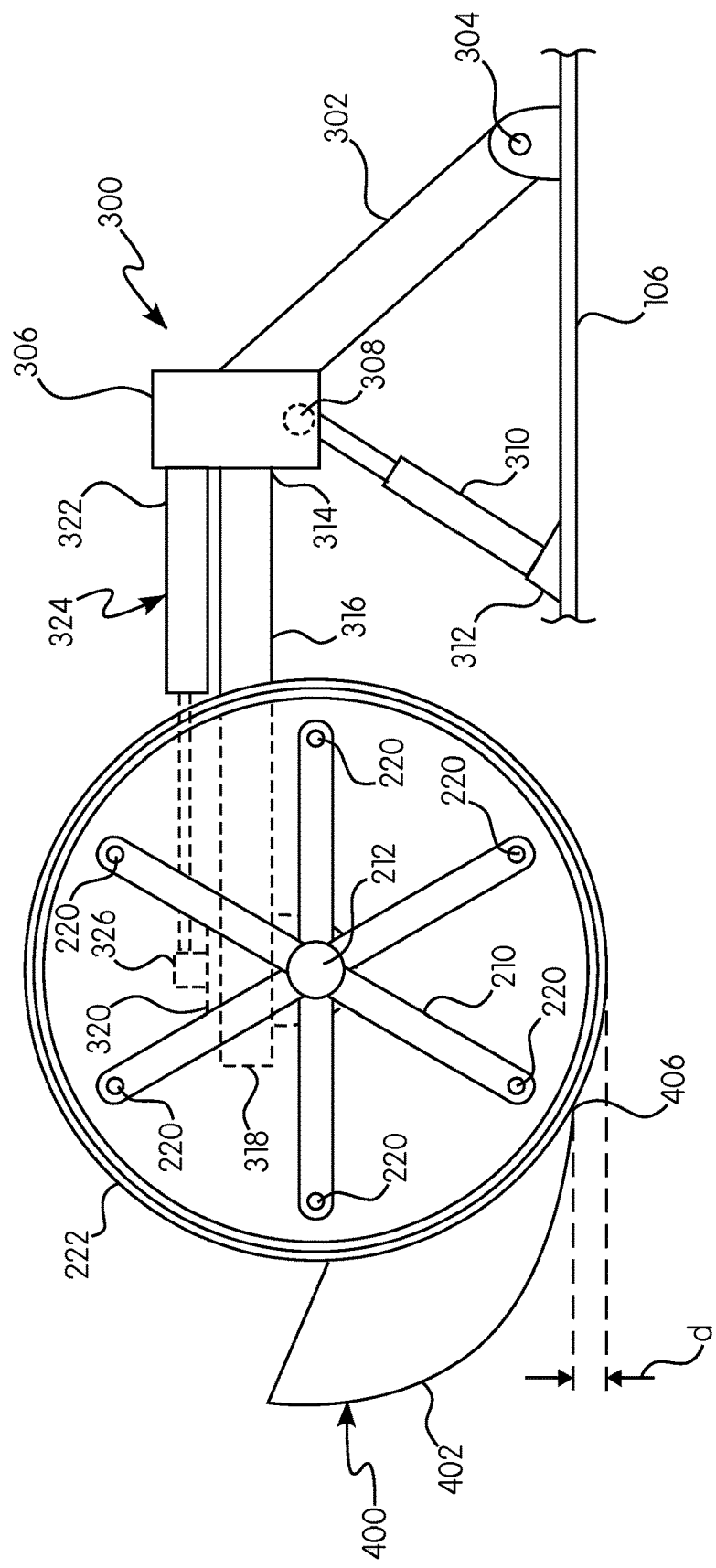
FIG. 3 is a partial cross sectional view of the header of FIG. 1 with certain elements omitted for purposes of illustration.

Referring now to FIGS. 1 and 3, the frame 106 is the structural chassis of the header 102 and allows for the various components of the header 102 to be attached thereto. The header 102 is attached to a forward end of the harvester 100, and is configured to cut crops, including (without limitation) small grains (e.g., wheat, soybeans, grain, etc.), and to induct the cut crops into a feederhouse 109 as the harvester 100 moves forward over a crop field.

The header 102 includes a floor 104 that is supported in desired proximity to a surface of a crop field and a cutter bar 110. The cutter bar 110 of the header 102 extends transversely along a forward edge of the floor 104 i.e., in a widthwise direction of the harvester 100, and is bound by a first side edge 112 and an opposing second side edge 114, which are both adjacent to the floor 104. The cutter bar 110 is configured to cut crops in preparation for induction into the feederhouse 109. It is appreciated that the cutter bar 110 includes one or more reciprocating sickles such as those disclosed in U.S. Pat. No. 8,151,547, the entire disclosure of which is incorporated herein by reference for all purposes.

The elongated and rotatable harvesting reel assembly 202 extends above and in close proximity to the cutter bar 110. The harvesting reel assembly 202 is typically configured to cooperate with a plurality of draper belts, such as lateral draper belts and infeed draper belts (not illustrated), for conveying cut crops to the feederhouse 109, for threshing and cleaning. The header 102 may include a rotatable auger, i.e. a conveyor screw (not illustrated), to facilitate feeding into the feederhouse 109. While the foregoing aspects of the harvester 100 are being described with respect to the header 102 shown, the harvesting reel assembly 202 of the subject disclosure can be applied to any other header having use for such a reel assembly. It is understood that, unless otherwise specified, the right side of the harvesting reel assembly 202 is substantially structurally similar to the left side.

The harvesting reel assembly 202 comprises at least a pair of harvesting reels or, simply, first and second reels 200L, 200R which include at least a pair of spaced apart reel spiders 210L, 210R engaged on rotatable shafts or axles 212L, 212R supported at their outer ends 214L, 214R by outboard supports 216L, 216R for rotation about a reel axis 218. The spiders 210L, 210R in turn support a plurality of pivotally moveable tine bars 220 (the tines of which are not illustrated) which orbit about reel axis 218 as the spiders rotate about the reel axis. Additional spiders may be intermediately positioned between the outboard spiders for additional tine bar support in wider reels.

The first reel 200L and the second reel 200R are spaced apart from one another a fixed distance "W". At the innermost ends of reels 200L, 200R are spiders 210L, 210R, one of which is shown in FIG. 3, that carry tine bars 220 fitted at their ends with cams (not illustrated). The cams in turn engage a cam assembly 222 that is part of the reel support structure, described below, and is operatively engaged with and between the first and second reels. The cams follow the cam assembly and rotate the tine bars 220 and the tines carried thereby as the reels 200R, 200L rotate about shafts 212L, 212R, whereby the angle of the tines is varied by pivotal movement of the tine bars 220 to angularly orient the tines for most effective crop movement.

Figure 2:
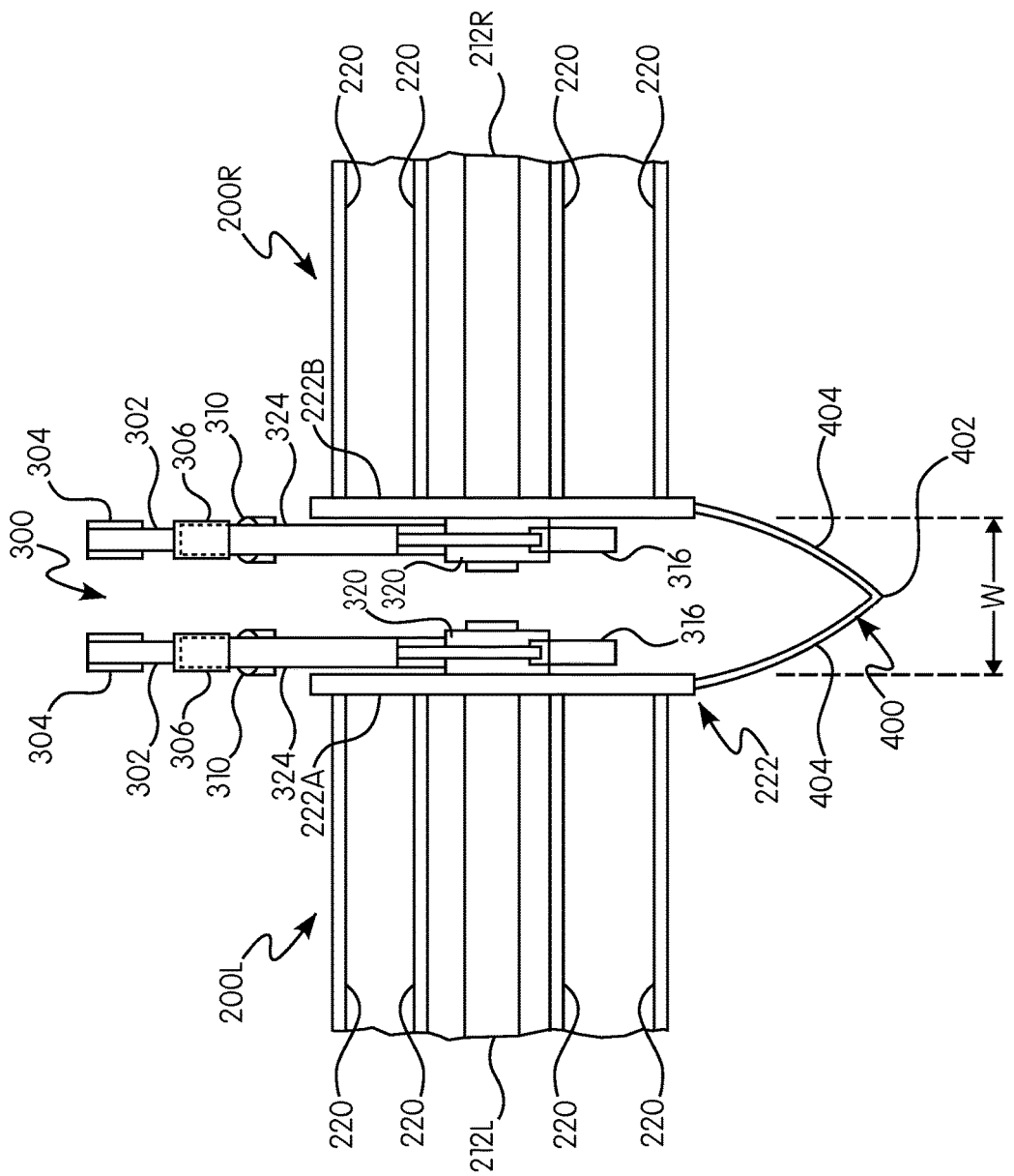
FIG. 2 is a top view of a portion of the header of FIG. 1 in accordance with an aspect of the exemplary embodiment of the subject disclosure with certain elements omitted for purposes of illustration.
Figure 5:
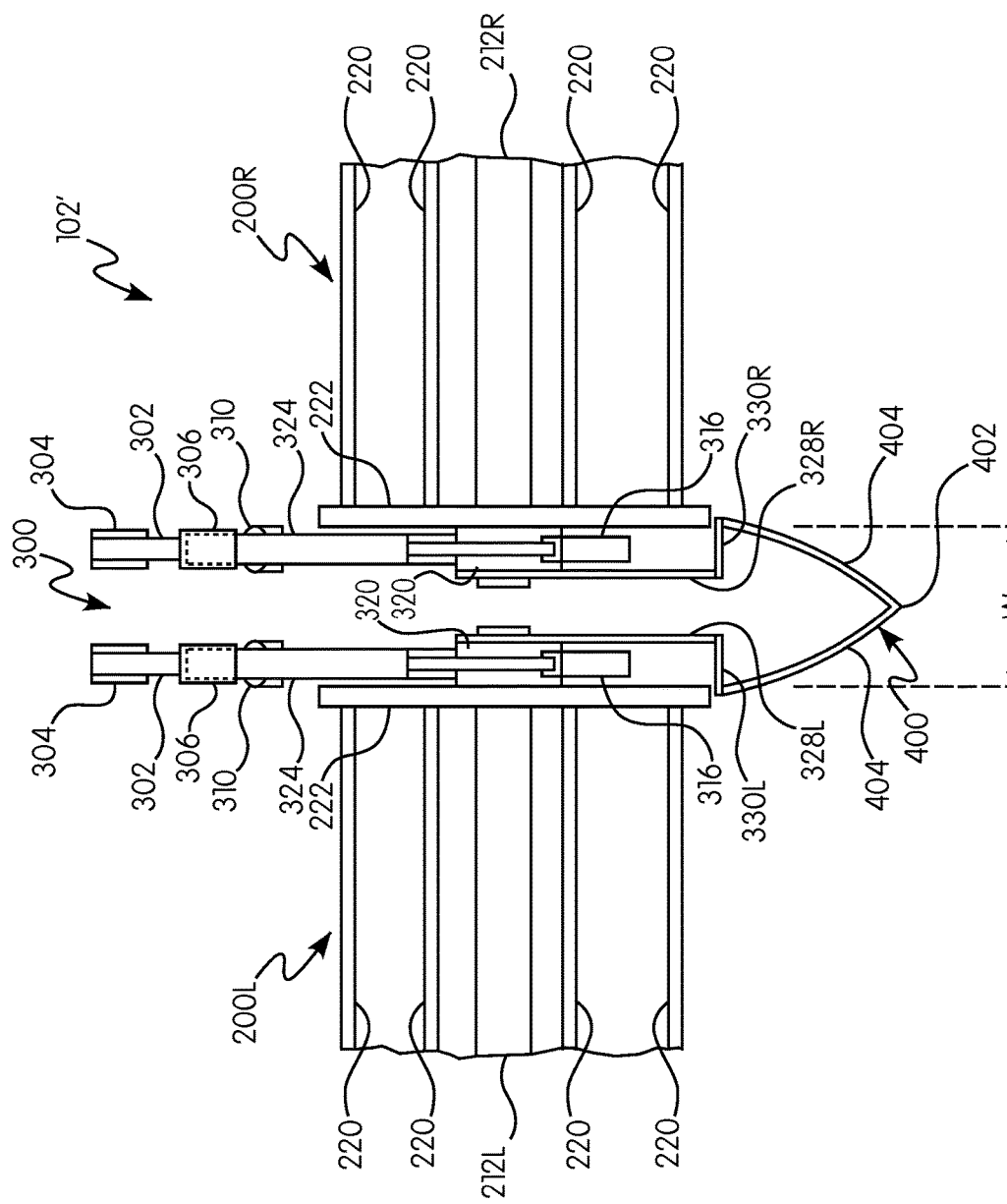
FIG. 5 is a top view of a portion of a header in accordance with another exemplary embodiment of the subject disclosure with certain elements omitted for purposes of illustration.

Referring to FIGS. 2, 3 and 5, the reel support structure 300 supports the reels 200L, 200R and further includes mechanisms for moving the reels in fore and aft and vertical directions, whereby the reels may move between any number of first and second positions. According to an exemplary embodiment, the header comprises at least a first extensible actuator 310 operably connected to the reel support structure for moving the first and second reels in vertical directions and at least a second extensible actuator 324 operably connected to the reel support structure for moving the first and second reels in fore and aft directions. In this regard, as seen in FIG. 3, reel support structure 300 includes a brace 302 pivotably mounted to header frame 106 at a pivot 304. The upper end of brace 302 is fixedly connected to a first bracket 306. Pivotably connected to first bracket 306 is one end 308 of a first extensible actuator 310 such as a hydraulic cylinder or the like, the opposite end 312 of which is connected to header frame 106.

Also fixedly connected to first bracket 306 is one end 314 of a reel arm 316, the opposite end 318 of which is slidably received in a second bracket 320. The lower end of second bracket 320 rotatably receives an end of the reel shaft. Additionally connected to the first bracket 306 is one end 322 of a second extensible actuator 324 such as a hydraulic cylinder or the like, the opposite end 326 of which is connected to the second bracket 320. So constructed and arranged, extension and retraction of the first extensible actuator 310 raises and lowers its respective reel 220L or 200R in a vertical direction, whereas extension and retraction of second extensible actuator 324 moves its respective reel 220L or 200R in fore and aft directions.

Figure 4:
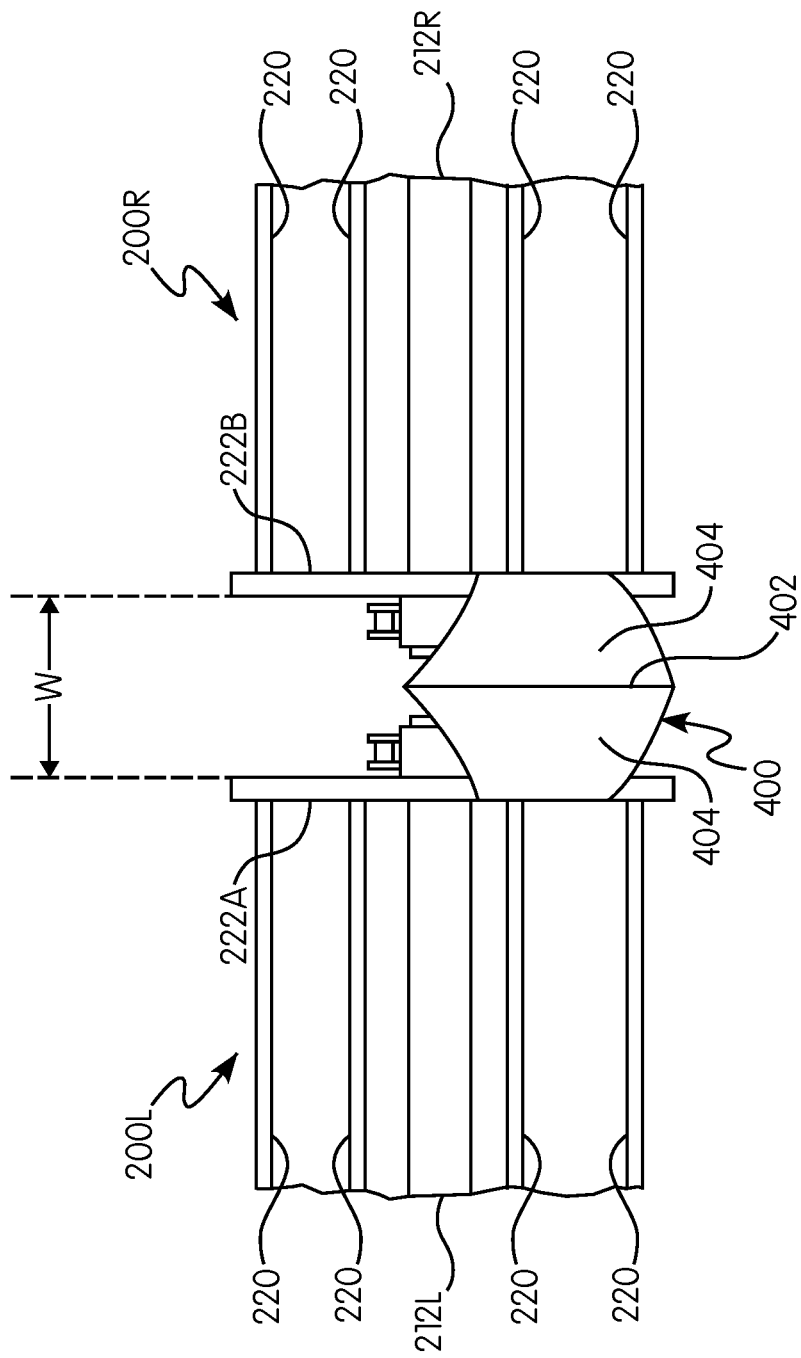
FIG. 4 is a front elevational view of a portion of the header of FIG. 1 with certain elements omitted for purposes of illustration.

Referring to FIGS. 2, 3 and 4, there is shown a first connection of a crop divider 400 to a forward end of reel support structure 300, specifically to cam assembly 222. The cam assembly is operatively engaged with at least one of the first and second reels 200L, 200R and the crop divider substantially covers a width of the cam assembly. In particular, cam assembly 222 includes a first cam assembly 222A engaged with the first reel 200L and a second cam assembly 222B engaged with the second reel 200R, whereby the first and second cam assemblies 222A, 222B define a fixed distance "W". The crop divider 400 is positioned forwardly of the fixed distance and extends between the first and second cam assemblies. The crop divider 400 may be fixedly connected to the cam assemblies 222A, 222B by welding, riveting, adhesives or the like. Alternatively, the crop divider may be releasably connected to the cam assembly by mechanical fasteners such as screws, bolts, or the like.

Turning to FIG. 5, there is shown another embodiment of a header 102' having the crop divider 400 connected to the support structure 300. According to this exemplary embodiment, the crop divider 400 may, e.g., be connected to the second brackets 320 by a pair of third brackets 328L, 328R. More particularly, aft portions of third brackets are preferably affixed to the second brackets 320 by welding, riveting, bolting or the like, whereas fore ends of the third brackets define outwardly directed flanges 330L, 330R to which the crop divider 400 may be fixedly or releasably attached such as by welding, riveting, adhesives, or mechanical fasteners such as screws or bolts. Regardless of how the crop divider is connected to the support structure, the crop divider moves in unison with the first and second reels in the fore and aft directions and vertical directions and does not rotate with the first and second reels 200L, 200R.

As seen in FIGS. 1, 2, 4 and 5, the crop divider 400 substantially spans the fixed distance "W", regardless of whether the fixed distance is established by the cam assembly 222 or the third brackets 328. The crop divider has a beveled face including a central ridge 402 flanked by rearwardly directed walls 404. According to an exemplary embodiment, the walls 404 are convex. Further, as seen in FIG. 3, the crop divider is elongated and curved and has a bottom 406 that is spaced a distance "d" from a bottom of the reel assembly. In particular, the crop divider extends generally from a bottom portion of the support structure to about a most forward end of the support structure.

It is appreciated that any number of reels, reel arms and crop dividers may be employed according to the subject disclosure. Thus, the disclosure is in no way limited to the number of these components depicted in the drawings.

The advantages of a header having one or more crop dividers constructed and arranged as described are apparent. Specifically, crop field harvesting efficiency can be significantly increased because crop is diverted to the left and right of the crop divider whereby it is effectively gathered by the harvesting reels for increased harvesting efficiency. In addition, the crop dividers prevent crop from gathering between the harvesting reels and clogging the moving parts therebetween, thereby improving harvesting operations and increasing the useful life of the header.

While the present disclosure has been described with reference to exemplary embodiments, it will be appreciated by those skilled in the art that various changes may be made and equivalents may be substituted for elements thereof without departing from the scope of the subject disclosure. For example, features described in one embodiment may be incorporated into a different embodiment.

In addition, modifications may be made to adapt a particular situation or material to the teachings of the subject disclosure without departing from the essential scope thereof. It is to be understood, therefore, that the subject disclosure is not be limited to the particular aspects disclosed, but it is intended to cover modifications within the spirit and scope of the subject disclosure as defined by the appended claims.

We claim:
1. A header for an agricultural harvester comprising:
a frame;
a reel assembly including a first reel and a second reel spaced from the first reel a fixed distance;
a reel support structure extending from the frame and supporting the first and second reels for movement between first and second positions, the reel support structure including:

a brace extending from the frame and supporting the reel assembly, a first actuator operatively connected to the brace for moving the brace in a vertical direction, and a second actuator extending from the brace and operatively connected to the reel assembly for moving the reel assembly in fore and aft directions; and a crop divider connected to the reel assembly, wherein the crop divider substantially spans a width of the fixed distance.

2. The header of claim 1, wherein the crop divider is connected to the reel support structure.

3. The header of claim 1, wherein the crop divider includes a beveled face.

4. The header of claim 1, wherein the crop divider includes a central ridge flanked by rearwardly directed walls.

5. The header of claim 4, wherein the rearwardly directed walls are convex.

6. The header of claim 1, wherein the crop divider is elongated and curved.

7. The header of claim 1, wherein the crop divider is positioned forwardly of the fixed distance.

8. The header of claim 1, wherein a bottom of the crop divider is spaced from a bottom of the reel assembly.

9. The header of claim 1, wherein the reel support structure includes a cam assembly operatively engaged with at least one of the first and second reels, and the crop divider substantially covers a width of the cam assembly.

10. The header of claim 1, wherein the crop divider is connected to a forward end of the reel support structure.

11. The header of claim 10, wherein the crop divider extends from a bottom portion of the support structure to about a most forward end of the support structure.

12. The header of claim 1, wherein the reel support structure includes a first cam assembly engaged with the first reel and a second cam assembly engaged with the second reel, and wherein the crop divider extends between the first and second cam assemblies.

13. The header of claim 1, wherein the reel support structure includes a first cam assembly engaged with the first reel and spaced from a second cam assembly engaged with the second reel defining the fixed distance.

14. A header for an agricultural harvester comprising:

a frame;

a reel assembly including a first reel and a second reel spaced from the first reel a spaced distance;

a reel support structure supporting the first and second reels for movement between first and second positions, the reel support structure including:

a brace connected to the frame and supporting the reel assembly, a first actuator operatively connected to the brace for moving the brace in a vertical direction, and a second actuator extending from the brace and operatively connected to the reel assembly for moving the reel assembly in fore and aft directions; and a crop divider spanning across the spaced distance between the first and second reels.

15. The header of claim 14, wherein the reel support structure further includes a reel arm extending from the brace supporting the reel assembly.

16. The header of claim 14, wherein the reel support structure further includes a first cam assembly operatively engaged with the first reel and a second cam assembly operatively engaged with the second reel.

17. The header of claim 16, wherein the crop divider is connected to at least one of the first and second cam assemblies.

18. The header of claim 14, wherein the crop divider is connected to and supported by the support structure.

19. The header of claim 14, wherein the crop divider is connected to the support structure and covers a forward end of the support structure.

\* \* \* \* \*